US012687612B2

(12) United States Patent
He

(10) Patent No.: US 12,687,612 B2
(45) Date of Patent: Jul. 21, 2026

(54) MICROWAVE ANTENNA PROBE

(71) Applicant: Yinwang Intelligent Technologies Co., Ltd., Shenzhen (CN)

(72) Inventor: Zhongxia Simon He, Munich (DE)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 192 days.

(21) Appl. No.: 18/749,258

(22) Filed: Jun. 20, 2024

(65) Prior Publication Data

US 2024/0337725 A1 Oct. 10, 2024

Related U.S. Application Data

(63) Continuation of application No. PCT/EP2021/087310, filed on Dec. 22, 2021.

(51) Int. Cl.
*G01S 7/40* (2006.01)
*H01Q 23/00* (2006.01)

(52) U.S. Cl.
CPC ........... *G01S 7/4021* (2013.01); *H01Q 23/00* (2013.01)

(58) Field of Classification Search
CPC ............... G01R 1/06772; G01R 29/10; G01R 31/2886; G01S 7/40; G01S 7/4021;
(Continued)

(56) References Cited

U.S. PATENT DOCUMENTS 2,908,875 A * 10/1959 Blatt ...................... H01P 1/264
252/504
3,040,252 A * 6/1962 Novak ................... G01R 21/04
324/95
(Continued)

FOREIGN PATENT DOCUMENTS

JP 4236607 B2 3/2009

OTHER PUBLICATIONS

Aftanasar et al., "Fabrication of Dielectric-Filled Rectangular Waveguide using Thick-Film Processing," 6th IEEE High Frequency Postgraduate Colloquium (Cat. No. 01TH8574), Cardiff, UK, Sep. 2001, 6 pages.
(Continued)

*Primary Examiner* — Peter M Bythrow
(74) *Attorney, Agent, or Firm* — Fish & Richardson P.C.

(57) ABSTRACT

Example microwave antenna probes, radio frequency arrangements, and methods for controlling an antenna patch connected to a microwave transmission line are disclosed. The antenna patch and the microwave transmission line are attached on a printed circuit board. An example microwave antenna probe includes a metal body, a waveguide, and a cavity. The metal body includes a bottom face and a top face opposing the bottom face. The waveguide is formed in the metal body. The cavity is formed at the bottom face of the metal body and is coupled with the waveguide and configured to enable microwave transition between the microwave transmission line and the waveguide. The microwave antenna probe is configured to disable the antenna patch and to redirect an antenna feeding signal from the microwave transmission line via the cavity to the waveguide when the antenna patch is contacted by the bottom face of the metal body.

20 Claims, 8 Drawing Sheets

(58) Field of Classification Search
CPC ......... H01P 5/107; H01Q 23/00; H04B 17/00;
H04B 17/10
See application file for complete search history.

(56) References Cited

U.S. PATENT DOCUMENTS

| | | | | |
|---|---|---|---|---|
| 4,020,427 | A * | 4/1977 | Connerney | H01P 1/264 |
| | | | | 333/81 B |
| 4,638,268 | A * | 1/1987 | Watanabe | H01P 1/262 |
| | | | | 338/216 |
| 4,799,031 | A * | 1/1989 | Lang | H01P 1/262 |
| | | | | 333/81 B |
| 5,408,188 | A * | 4/1995 | Katoh | H01P 5/107 |
| | | | | 333/26 |
| 5,420,506 | A * | 5/1995 | Lin | G01R 1/045 |
| | | | | 324/756.07 |
| 5,539,361 | A * | 7/1996 | Davidovitz | H01P 5/085 |
| | | | | 333/34 |
| 5,742,211 | A * | 4/1998 | Lauf | H01P 1/26 |
| | | | | 333/81 B |
| 6,081,241 | A * | 6/2000 | Josefsson | H01P 5/107 |
| | | | | 343/771 |
| 7,276,921 | B2 * | 10/2007 | Perry | H05K 1/0243 |
| | | | | 324/750.27 |
| 7,548,069 | B2 * | 6/2009 | Simpson | G01R 31/2822 |
| | | | | 324/637 |
| 7,750,859 | B2 * | 7/2010 | Rao | H01Q 17/00 |
| | | | | 343/703 |
| 7,876,276 | B1 * | 1/2011 | Zaman | H01Q 3/08 |
| | | | | 343/703 |
| 7,888,957 | B2 * | 2/2011 | Smith | G01R 1/07378 |
| | | | | 324/755.09 |
| 7,915,909 | B2 * | 3/2011 | Dunn | G01R 31/2822 |
| | | | | 324/762.01 |
| 8,319,503 | B2 * | 11/2012 | Negishi | G01R 29/26 |
| | | | | 324/613 |
| 8,847,617 | B2 * | 9/2014 | Nickel | G01R 31/3025 |
| | | | | 324/754.21 |
| 8,901,719 | B2 * | 12/2014 | Ligander | H10W 44/20 |
| | | | | 257/664 |
| 8,952,711 | B2 * | 2/2015 | Wang | G01R 35/005 |
| | | | | 324/750.02 |
| 9,863,976 | B2 * | 1/2018 | Sarhad | G01R 31/69 |
| 10,274,515 | B1 * | 4/2019 | Sherry | G01R 1/0466 |
| 10,393,772 | B2 * | 8/2019 | Lee | G01R 31/2886 |
| 11,079,429 | B2 * | 8/2021 | Zanati | G01R 31/2886 |
| 11,360,117 | B1 * | 6/2022 | Sherry | G01R 1/045 |
| 11,742,960 | B2 * | 8/2023 | Hesselbarth | H04B 17/0085 |
| | | | | 455/67.14 |
| 2009/0153158 | A1 * | 6/2009 | Dunn | G01R 31/2822 |
| | | | | 324/762.01 |
| 2012/0262188 | A1 * | 10/2012 | Nickel | G01R 1/06772 |
| | | | | 324/629 |

| | | | | |
|---|---|---|---|---|
| 2013/0015870 | A1 * | 1/2013 | Nickel | G01R 1/06772 |
| | | | | 324/754.03 |
| 2013/0271328 | A1 * | 10/2013 | Nickel | G01R 29/10 |
| | | | | 343/703 |
| 2013/0328582 | A1 * | 12/2013 | Han | H01Q 9/0442 |
| | | | | 324/750.01 |
| 2014/0179239 | A1 * | 6/2014 | Nickel | H04B 17/12 |
| | | | | 455/67.14 |
| 2015/0168486 | A1 * | 6/2015 | Isaac | G01R 31/2822 |
| | | | | 324/756.02 |
| 2016/0293557 | A1 * | 10/2016 | Topak | H10W 44/20 |
| 2016/0351988 | A1 * | 12/2016 | Yang | H01P 5/08 |
| 2017/0102409 | A1 * | 4/2017 | Sarhad | G01R 31/31905 |
| 2017/0201028 | A1 * | 7/2017 | Eberhardt | H01P 3/06 |
| 2017/0227598 | A1 * | 8/2017 | Lam | G01R 1/045 |
| 2018/0003754 | A1 * | 1/2018 | Schrattenecker | G01R 29/10 |
| 2019/0113556 | A1 * | 4/2019 | Kao | G01R 29/10 |
| 2019/0296835 | A1 * | 9/2019 | Deriso | H01Q 9/045 |
| 2020/0256908 | A1 * | 8/2020 | Han | G01R 1/045 |
| 2020/0304216 | A1 * | 9/2020 | Cooper | H01Q 21/062 |
| 2021/0033668 | A1 * | 2/2021 | Trotta | H04B 17/17 |
| 2021/0305673 | A1 * | 9/2021 | Ohlsson | H01P 5/107 |
| 2021/0364547 | A1 * | 11/2021 | Mroczkowski | G01R 1/045 |
| 2021/0376439 | A1 * | 12/2021 | Karlsson | H01Q 9/0407 |
| 2024/0345148 | A1 * | 10/2024 | Schroff | G01R 29/0878 |

OTHER PUBLICATIONS

Cuenca et al., "Low-Loss mm-Wave Transition from On-Chip Microstrip to Rectangular Waveguide," 2Proceedings of the 12th European Microwave Integrated Circuits Conference, Oct. 2017, 4 pages.
Yang et al., "A Fast Calibration Method for Phased Arrays by Using the Graph Coloring Theory," Sensors, Dec. 2018, 19 pages.
Samir et al., "A CPW Excitation Using a Contactless Dielectric Waveguide Probe for the V-Band," Proceedings of the 50th European Microwave Conference (EuMC), Utrecht, Netherlands, Jan. 2021, 4 pages.
Alaee-Kerahroodi et al., "CDM-MIMO in Next-Generation mmWave Automotive Radar Sensors," URSI AP-RASC 2019, New Delhi, India, Mar. 9-15, 2019, 4 pages.
Visentin et al., "Calibration of a Fully Polarimetric 8x8 MIMO FMCW Radar System at 77 GHz," 2017 11th European Conference on Antennas and Propagation (EUCAP), Paris, France, Mar. 2017, 5 pages.
Spinner, "Flexible Dielectric Waveguide Set R 740 60-90 GHz 1x900 mm EasySnake," BN: 533659C0131, 2024, retrieve from URL: <https://products.spinner-group.com/flexible-dielectric-waveguide-set-r-740-60-90-ghz-1x900-mm-easysnake-bn533659C0131>, 3 pages.
International Search Report and Written Opinion in International Appln. No. PCT/EP2021/087310,2022, 15 pages.

* cited by examiner

300a

300b

MICROWAVE ANTENNA PROBE

CROSS-REFERENCE TO RELATED APPLICATIONS

This application is a continuation of International Application No. PCT/EP2021/087310, filed on Dec. 22, 2021, the disclosure of which is hereby incorporated by reference in its entirety.

TECHNICAL FIELD

The present disclosure relates to the field of radar systems and antennas for microwave transmission, in particular, with respect to automotive applications. The disclosure particularly relates to a microwave antenna probe, a radio frequency arrangement using such microwave antenna probe and a method for controlling an antenna patch attached on a printed circuit board.

BACKGROUND

In advanced radar systems, Doppler division multiplexing (DDM) MIMO (multiple input multiple output) is often used, where different transmitter antennas are phase encoded and their echo can be separate at each receiver antenna to create virtual multiple antenna array. To ensure different transmission signal separation, the phase coding at each antenna should be maintained orthogonal. Such orthogonality will be compromised when transmitter antenna waveform is not fully phase coherent, which in turn results reducing virtual array aperture and detection resolution.

The degradation of transmitter channels orthogonality may be caused by phase noise, incorrectly selection of phase codes, amplitude uncertainty, etc. One root cause of such uncertainty results from poor Printed Circuit Board (PCB) design, specifically by unwanted antenna coupling, or non-ideal matching between antenna and transmitter semiconductors.

SUMMARY

This disclosure provides a solution for a non-destructive probing of a microwave antenna patch with direct access to the transmitting waveform, in particular for probing a microwave antenna patch attached on a printed circuit board.

During development of mm-wave radars, and repairing of failed radar units, it is appreciated if antenna can be temporally disabled in order to have direct access to the transmitting waveform by using a probe. Preferably, such probing should be non-destructive, i.e., without damaging the radar unit.

The foregoing and other objects are achieved by the features of the independent claims. Further implementation forms are apparent from the dependent claims, the description and the figures.

The disclosure presents a novel concept for non-destructive probing. The disclosure presents a probe that physically covers either transmitter antenna or receiver antenna and disables that antenna, while the signal from that antenna will be redirected to a flexible signal transmission line which either can be connected to another probe, e.g., by jumping between different transmitter and receiver channels, or can be connected to an external measurement equipment.

Such a novel microwave antenna probe allows non-destructive inspection. The probe will disable the antenna structure when used and allows to redirect the antenna signal into a flexible air-filled waveguide (WG) or a flexible dielectric waveguide interface.

The disclosed microwave antenna probe provides flexible interconnection for microwave signal transmission and bridging between channels. By adding a flexible waveguide cable to the probe, the microwave antenna probe allows arbitrary bridging between channels and calibration of the radar system.

The disclosed microwave antenna probe also provides an add-on waveguide interface on standard PCB antenna radar modules for measurement and test. This allows radar to be interfaced with high gain waveguide antennas or other waveguide components, i.e. filters, couplers, or an orthomode transducer.

The following three characteristics are example points of the novel microwave antenna probe:

1) Using a probe to simultaneously terminate the antenna and redirect the microwave signal from antenna to a waveguide interface, e.g., an air-filled waveguide or a dielectric waveguide.

2) Using a cavity above the printed circuit board to direct microwave signal from transmission line to the waveguide interface when antenna is shorted.

3) Optionally using periodical holes around the probe on the side facing printed circuit board to suppress microwave signal leakage when antenna is shorted.

A benefit of such novel microwave antenna probe is the ability to disable the antenna and to transfer the microwave signal from antenna feeding transmission line to an external port. This can be realized by the probe structure which is able to short or by-pass the antenna without destroying the existing antenna structure.

The antenna structure can be implemented on a printed circuit board (PCB) technology where an antenna patch trace is floating on one side of the PCB with another side as continued ground metal. When using the novel microwave antenna probe according to this disclosure, the microwave signal leak out between top and low layer of the PCB within PCB substrate, when antenna is shorted by contacting it with the probe, can be avoided or at least significantly reduced due to the specific structure of the probe as described hereinafter.

According to a first aspect, the disclosure relates to a microwave antenna probe for controlling an antenna patch connected to a microwave transmission line, the antenna patch and the microwave transmission line being attached on a printed circuit board, the microwave antenna probe comprising: a metal body comprising a bottom face and a top face opposing the bottom face; a waveguide formed in the metal body; and a cavity formed at the bottom face of the metal body, the cavity being coupled with the waveguide and configured to enable microwave transition between the microwave transmission line and the waveguide; wherein the microwave antenna probe is configured to disable the antenna patch and to redirect an antenna feeding signal from the microwave transmission line via the cavity to the waveguide when contacting the antenna patch by the bottom face of the metal body.

Such a microwave antenna probe allows non-destructive inspection. The microwave antenna probe will disable the antenna patch when used and allows to redirect the antenna feeding signal into a waveguide. The redirected antenna feeding signal may be accessed by an air-filled waveguide interface or by a flexible waveguide interface.

The microwave antenna probe physically covers either transmitter antenna or receiver antenna and disables that antenna, while the signal from that antenna will be redirected to a flexible signal transmission line which either can be connected to another probe, e.g., by jumping between different transmitter and receiver channels, or can be connected to an external measurement equipment, thereby allowing non-destructive inspection or signal bridging. The microwave antenna probe can be released from the PCB when inspection is finished without any damage of the antenna patch or the microwave transmission line on the PCB.

In an exemplary implementation of the microwave antenna probe the cavity at the bottom face of the metal body is configured for placement above the microwave transmission line to enable microwave transition via the cavity.

This provides the advantage that when placing the cavity directly above the microwave transmission line, an optimal coupling of microwave energy from the transmission line to the waveguide can be achieved. Hence, the antenna feeding signal can be redirected into the waveguide without significant losses.

In an exemplary implementation of the microwave antenna probe, the microwave antenna probe comprises a shim embedded in the metal body, the shim separating the cavity from the waveguide, wherein the shim comprises at least one slot opening configured to enable the microwave transition between the cavity and the waveguide.

The shim can be used for influencing the electro-magnetic field in the waveguide and shaping the electro-magnetic field according to the requirements.

The slot opening can be one or multiple slot openings. For example, two parallel rectangular slots can be implemented. In another implementation, the slots can have different length for better bandwidth performance.

In an exemplary implementation of the microwave antenna probe the at least one slot opening has a bowtie shape, a C-shape, a H-shape, a rectangular shape or any other geometrical shape.

This provides the advantage that the electromagnetic field of wide bandwidth in the waveguide can be effectively redirect to the waveguide via the slot opening's shape.

In an exemplary implementation of the microwave antenna probe, the microwave antenna probe comprises a plurality of holes formed at the bottom face of the metal body, the holes being configured to suppress microwave signal leakage when the antenna patch is contacted by the bottom face of the metal body.

This provides the advantage that the holes can suppress microwave signal leakage and achieve an optimal redirection of the antenna feed signal originally to the antenna patch on the PCB to the waveguide of the microwave antenna probe.

In an exemplary implementation of the microwave antenna probe, the holes are periodically distributed across the bottom face of the metal body.

This provides the advantage that such a periodical redistribution of the holes allows a wideband suppression of microwave signal leakage.

In an exemplary implementation of the microwave antenna probe, the bottom face of the metal body forms a ground plane configured to short the antenna patch to ground when contacting the antenna patch by the bottom face.

This provides the advantage that the antenna patch can be easily shorted to ground by using the ground plane. The ground plane forms a large contacting area for reliably contacting the antenna patch on the PCB.

In an exemplary implementation of the microwave antenna probe, the microwave antenna probe comprises a clearance formed at the bottom face of the metal body between the cavity and a lateral side of the bottom face, wherein the clearance is configured for placement above the microwave transmission line and configured to avoid a short of the microwave transmission line when contacting the antenna patch by the bottom face of the metal body.

This provides the advantage that the clearance avoids a short of the microwave transmission line by preventing a contact of the metal body of the probe with the microwave transmission line on the PCB.

In an exemplary implementation of the microwave antenna probe, the microwave antenna probe comprises mechanical attachment means configured to mechanically attach the bottom face of the metal body to the antenna patch by providing a detachable mechanical connection.

This provides the advantage that the mechanical attachment means can provide a releasable mechanical and electrical connection of the probe with the antenna patch. I.e., the mechanical attachment means allows for non-destructive inspection using the probe.

In an exemplary implementation of the microwave antenna probe the waveguide comprises a WR-12 air-filled waveguide extending from the cavity at the bottom face of the metal body to the top face of the metal body.

This provides the advantage that a standardized waveguide for the operational frequency band, in this example WR-12, can be applied for redirection of the antenna feeding signal. Any other standardized waveguide can be applied as well.

In an exemplary implementation of the microwave antenna probe the waveguide comprises a first section formed as an air-filled waveguide and a second section formed as a dielectric waveguide, wherein the waveguide is tapered at a transition from the air-filled waveguide to the dielectric waveguide.

This provides the advantage that different types of waveguides can be connected to the microwave antenna probe. The dielectric waveguide can be flexible for providing a flexible connection of the waveguide to another antenna port or to an external equipment, e.g., a spectrum analyzer or network analyzer etc.

In an exemplary implementation of the microwave antenna probe a depth of the cavity is about a quarter wavelength of the antenna feeding signal.

This provides the advantage that an optimal transmission of the antenna feeding signal into the waveguide can be achieved.

In an exemplary implementation of the microwave antenna probe, the metal body comprises a full metal body or a plastic core.

This provides the advantage that the metal body can be easily manufactured with flexible design options. The plastic core can be covered at least partially by a metallization. In an alternative implementation, the plastic core can have no metallization.

In an exemplary implementation of the microwave antenna probe, the antenna feeding signal comprises a microwave signal.

This provides the advantage that the microwave antenna probe can be applied in various kinds of radar systems which use different antenna feeding signals. The microwave signal can be any kind of signal, for example a digital modulation signal, a chirp, a single tone signal, etc.

According to a second aspect, the disclosure relates to a radio frequency arrangement, comprising: a microwave antenna probe according to the first aspect; and a printed circuit board comprising: an antenna patch attached on the printed circuit board; and a microwave transmission line connecting the antenna patch to an integrated circuit, wherein the microwave transmission line and the integrated circuit are attached on the printed circuit board, wherein the microwave antenna probe is contacting the antenna patch by the bottom face of the metal body.

Such a radio frequency arrangement including a microwave antenna probe as described above allows non-destructive inspection. The microwave antenna probe can disable the antenna patch and redirect the antenna feeding signal into the waveguide. The redirected antenna feeding signal can be easily accessed.

The radio frequency arrangement provides the same technical advantages as described above for the microwave antenna probe.

According to a third aspect, the disclosure relates to a method for controlling an antenna patch attached on a printed circuit board, the method comprising: providing a microwave antenna probe, the microwave antenna probe comprising: a metal body comprising a bottom face and a top face opposing the bottom face; a waveguide formed in the metal body; and a cavity formed at the bottom face of the metal body, the cavity being coupled with the waveguide and configured to enable microwave transition between a microwave transmission line attached on the printed circuit board and the waveguide, wherein the method comprises: contacting the antenna patch by the bottom face of the metal body; disabling the antenna patch by the contact with the bottom face of the metal body; and redirecting an antenna feeding signal from the microwave transmission line via the cavity to the waveguide by the contact with the bottom face of the metal body.

The advantages of the method are the same as those for the corresponding implementation forms of the microwave antenna probe and radio frequency arrangement described above.

In particular, such a method provides the advantage of non-destructive inspection. The microwave antenna probe can disable the antenna patch and redirect the antenna feeding signal into the waveguide as described above with respect to the microwave antenna probe.

According to a fourth aspect, the disclosure relates to a computer program product including computer executable code or computer executable instructions that, when executed, causes at least one computer to execute the method according to the third aspect described above.

Such a computer program product can be implemented for example on a computer, a processor or a controller.

BRIEF DESCRIPTION OF THE DRAWINGS

Further embodiments of the disclosure will be described with respect to the following figures, in which:

FIG. 3a shows a 3-dimensional view of an electric circuit 300a on a PCB 140;

FIG. 3b shows a simplified equivalent circuit model 300b of the electric circuit 300a shown in FIG. 3a;

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

In this disclosure, antenna patches or patch antennas are described. A patch antenna is a type of antenna with a low profile, which can be mounted on a surface. It consists of a planar rectangular, circular, triangular, or any geometrical sheet or "patch" of metal, mounted over a larger sheet of metal called a ground plane.

In this disclosure, microwave antennas and microwave antenna probes are described. Microwave antennas are antennas for radiating microwaves. Microwave is a form of electromagnetic radiation with wavelengths ranging from about one meter to one millimeter corresponding to frequencies between about 300 MHz and 300 GHz respectively. Microwave antenna probes are probes, i.e., testing devices and equipment, for microwave antennas.

Microwave signals as described in this disclosure are radar waves and radar wave signals in a frequency range between about 40 GHz and 100 GHz corresponding to wavelengths between about 0.75 cm and 0.30 cm.

In this disclosure waveguides, in particular waveguides for microwave transmission are described. A waveguide is a transmission line for radio waves. A waveguide for microwave transmission is a transmission line for microwaves. Usually, the waveguide is formed as a hollow metal pipe and used for such purposes as connecting microwave transmitters and receivers to their antennas.

In this disclosure, a shim is described. A shim according to the disclosure is a thin (thickness <1 mm) metal sheet or specially shaped piece made of magnetic material to influence the electro-magnetic field in a waveguide.

Figure 1:
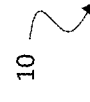
FIG. 1 shows a lateral cross-section of a radio frequency arrangement 10 with a microwave antenna probe 100 according to the disclosure.
Figure 1:
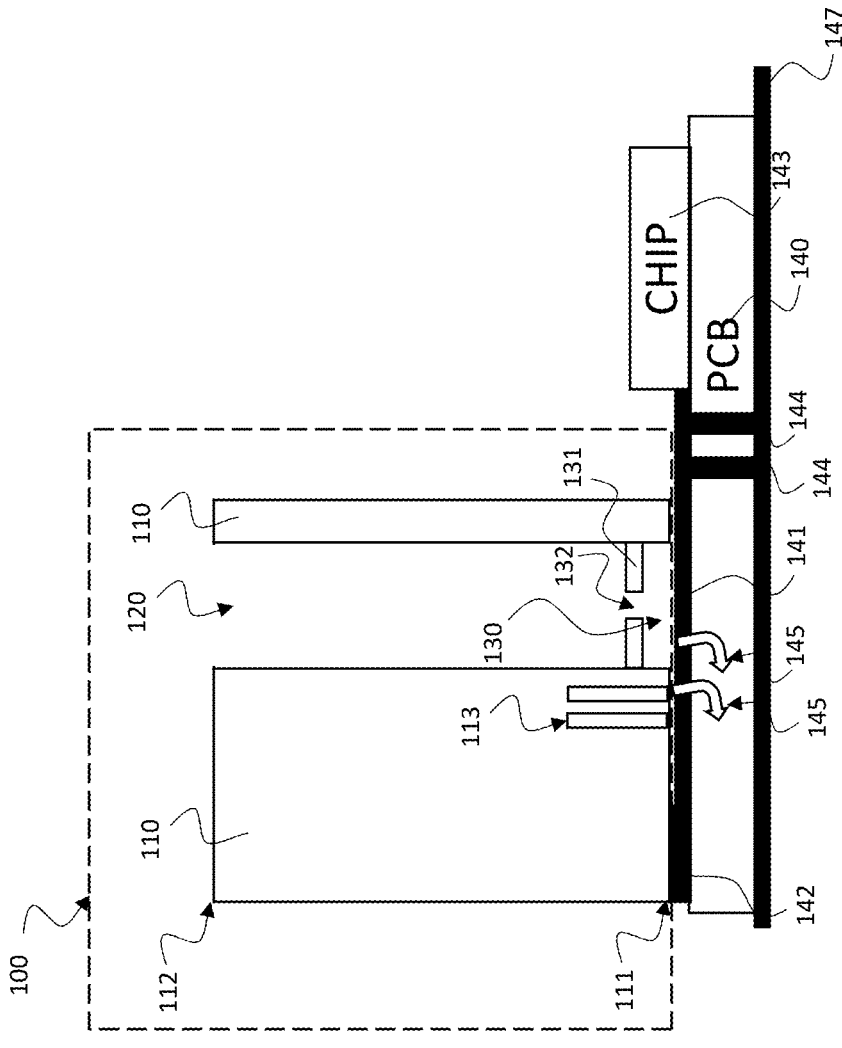

FIG. 1 shows a lateral cross-section of a radio frequency arrangement 10 according to the disclosure. The radio frequency arrangement 10 comprises a microwave antenna probe 100 contacting an antenna patch 142 on a printed circuit board (PCB) 140 according to the disclosure.

The microwave antenna probe 100 is designed for controlling an antenna patch 142 connected to a microwave transmission line 141. The antenna patch 142 and the microwave transmission line 141 are attached on a printed circuit board 140.

The microwave antenna probe 100 comprises: a metal body 110 comprising a bottom face 111 and a top face 112 opposing the bottom face 111; a waveguide 120 formed in the metal body 110; and a cavity 130 formed at the bottom face 111 of the metal body 110.

The cavity 130 is coupled with the waveguide 120 and configured to enable microwave transition between the microwave transmission line 141 and the waveguide 120.

The microwave antenna probe 100 is configured to disable the antenna patch 142 and to redirect an antenna feeding signal from the microwave transmission line 141 via the cavity 130 to the waveguide 120 when contacting the antenna patch 142 by the bottom face 111 of the metal body 110.

The cavity 130 at the bottom face 111 of the metal body 110 may be configured for placement above the microwave transmission line 141 to enable microwave transition via the cavity 130.

The microwave antenna probe 100 may comprise a shim 131 formed in the metal body 110. The shim 131 is separating the cavity 130 from the waveguide 120. The shim 131 may comprise at least one slot opening 132 configured to enable the microwave transition between the cavity 130 and the waveguide 120.

The at least one slot opening 132 can be one or multiple slot openings. For example, two parallel rectangular slots can be implemented. In another implementation, the slots can have different length for better bandwidth performance.

Figure 5:
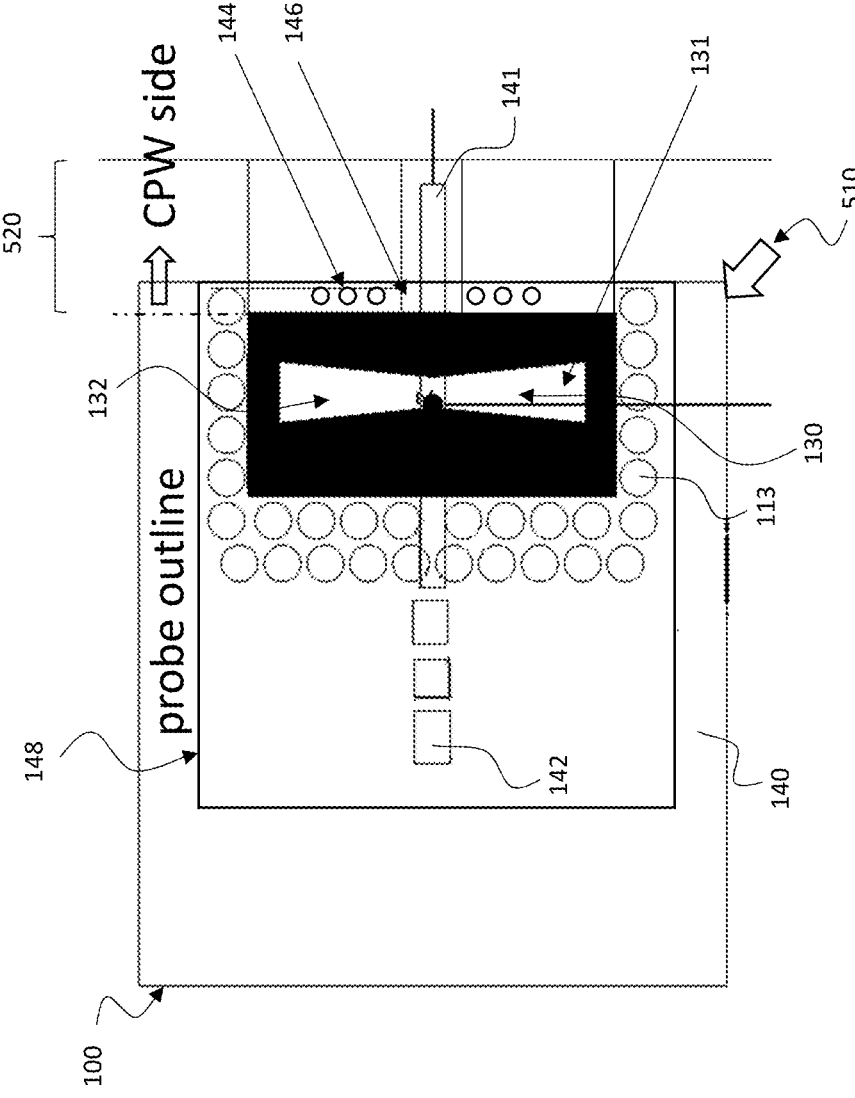
FIG. 5 shows a top cross-section of a microwave antenna probe 100 contacting an antenna patch 142 on a printed circuit board 140 according to the disclosure.

The at least one slot opening 132 can have a bowtie shape, e.g., as shown in FIG. 5, or a C-shape, a H-shape, a rectangular shape or any other geometrical shape.

The microwave antenna probe 100 may comprise a plurality of holes 113 formed at the bottom face 111 of the metal body 110. The holes 113 are configured to suppress microwave signal leakage when the antenna patch 142 is contacted by the bottom face 111 of the metal body 110.

The holes 113 can be periodically distributed across the bottom face 111 of the metal body 110, e.g., as shown in FIG. 5.

The bottom face 111 of the metal body 110 can form a ground plane configured to short the antenna patch 142 to ground when contacting the antenna patch 142 by the bottom face 111.

This ground plane can be connected by vias 144 to a ground metallization 147 attached at the bottom side of the PCB 140.

The microwave antenna probe 100 may comprise a clearance 146 formed at the bottom face 111 of the metal body 110 between the cavity 130 and a lateral side of the bottom face 111. The clearance 146 is configured for placement above the microwave transmission line 141. The clearance 146 is configured to avoid a short of the microwave transmission line when contacting the antenna patch 142 by the bottom face 111 of the metal body 110.

The microwave antenna probe 100 may comprise mechanical attachment means (not shown in FIG. 1) configured to mechanically attach the bottom face 111 of the metal body 110 to the antenna patch 142 by providing a detachable mechanical connection.

The mechanical attachment means may be implemented by screws, for example, or by a clamp connection or by magnetic fixation or any other releasable mechanic attachment.

The waveguide 120 may comprise, for example, a WR-12 air-filled waveguide extending from the cavity 130 at the bottom face 111 of the metal body 110 to the top face 112 of the metal body 110.

In one exemplary implementation, the waveguide 120 may comprise a first section formed as an air-filled waveguide and a second section formed as a dielectric waveguide. The waveguide can be tapered at a transition from the air-filled waveguide to the dielectric waveguide.

A depth of the cavity 130 may be about a quarter wavelength of the antenna feeding signal.

The metal body 110 may comprise a full metal body or a plastic core. The plastic core can be covered at least partially by a metallization. In an alternative implementation, the plastic core can have no metallization.

The antenna feeding signal may comprise a microwave signal. The microwave signal can be any kind of signal, for example a digital modulation signal, a chirp, a single tone signal, etc.

The microwave antenna probe 100 attached to the printed circuit board 140 forms a radio frequency arrangement 10. This radio frequency arrangement 10 comprises: the microwave antenna probe 100 as described above; and the printed circuit board 140 comprising: the antenna patch 142 attached on the printed circuit board 140; and a microwave transmission line 141 connecting the antenna patch 142 to an integrated circuit 143.

The microwave transmission line 141 and the integrated circuit 143 are attached on the printed circuit board 140. The microwave antenna probe 100 is contacting the antenna patch 142 by the bottom face 111 of the metal body 110.

Figure 2:
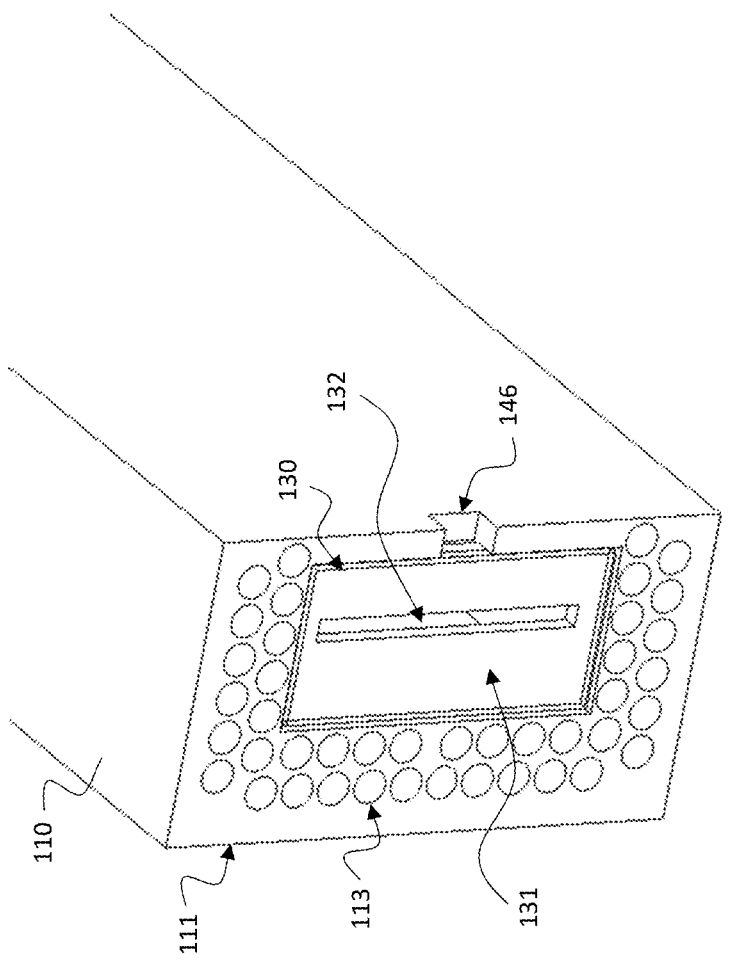
FIG. 2 shows a 3-dimensional view of the microwave antenna probe 100.
Figure 2:
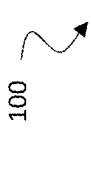

FIG. 2 shows a 3-dimensional view of the microwave antenna probe 100.

FIG. 2 shows the microwave antenna probe 100 without the printed circuit board 140 shown in FIG. 1. As described above with respect to FIG. 1, the microwave antenna probe 100 comprises a metal body 110 with a bottom face 111 and a top face 112 (not shown in FIG. 2) opposite to the bottom face 111; a waveguide 120 formed in the metal body 110 (not directly shown in FIG. 2); and a cavity 130 formed at the bottom face 111 of the metal body 110.

The cavity 130 is coupled with the waveguide 120 and configured to enable microwave transition between the microwave transmission line 141 and the waveguide 120. The microwave antenna probe 100 is configured to disable the antenna patch 142 and to redirect an antenna feeding signal from the microwave transmission line 141 via the cavity 130 to the waveguide 120 when contacting the antenna patch 142 by the bottom face 111 of the metal body 110.

The cavity 130 at the bottom face 111 of the metal body 110 may be configured for placement above the microwave transmission line 141 to enable microwave transition via the cavity 130.

The microwave antenna probe 100 may comprise a shim 131 formed in the metal body 110. The shim 131 is separating the cavity 130 from the waveguide 120. The shim 131 may comprise at least one slot opening 132 configured to enable the microwave transition between the cavity 130 and the waveguide 120.

In FIG. 2, a single rectangular slot opening 132 is shown. However, the at least one slot opening 132 can be one or multiple slot openings. For example, two or more parallel rectangular slots can be implemented. These slots can have the same length or can have different length for better bandwidth performance.

The microwave antenna probe 100 may comprise a clearance 146 formed at the bottom face 111 of the metal body 110 between the cavity 130 and a lateral side of the bottom face 111 as shown in FIG. 2. The clearance 146 is configured for placement above the microwave transmission line 141. The clearance 146 is configured to avoid a short of the microwave transmission line when contacting the antenna patch 142 by the bottom face 111 of the metal body 110.

Figures 3A, 3B:
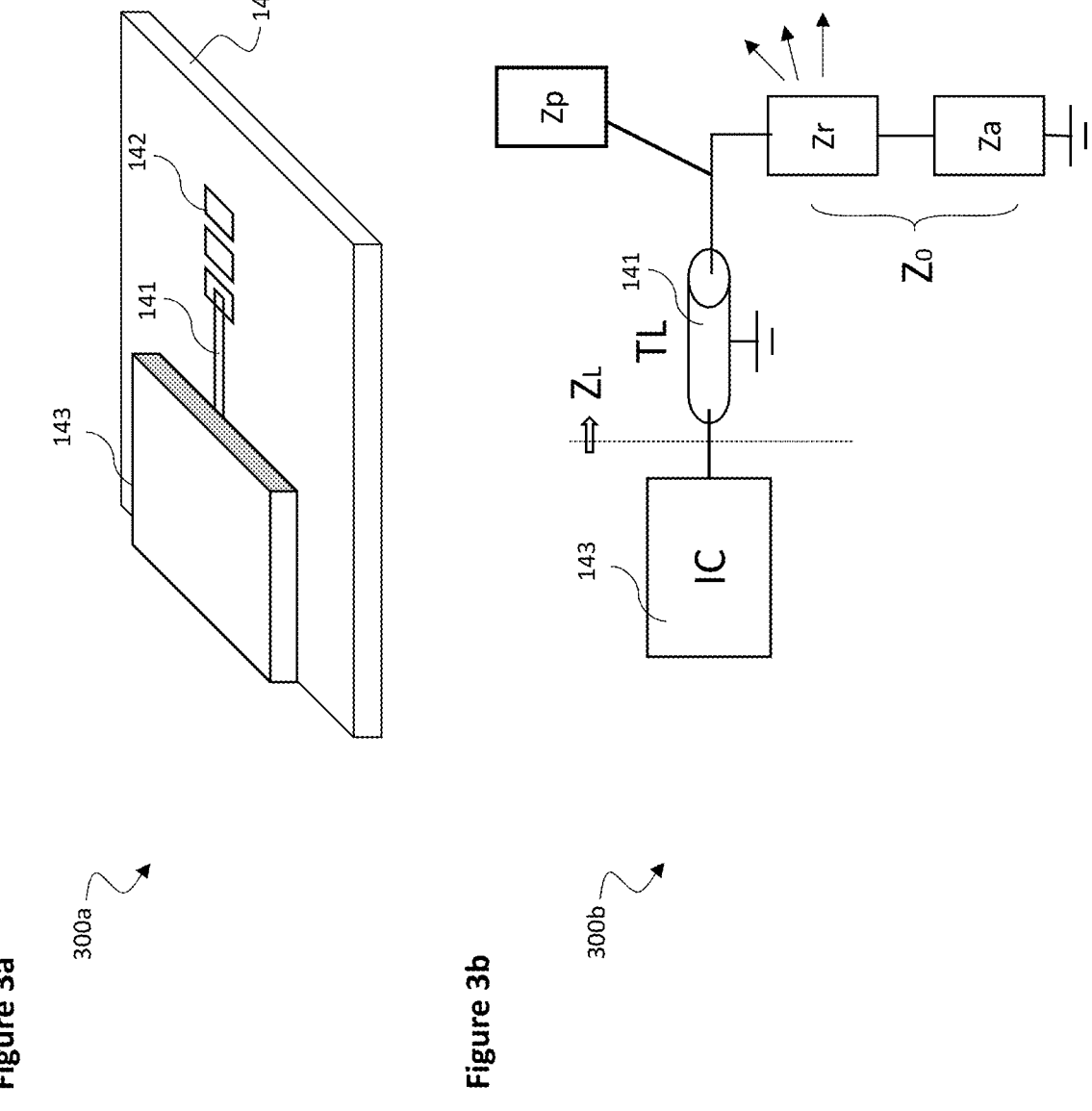

FIG. 3a shows a 3-dimensional view of an electric circuit 300a on a PCB 140. The electric circuit 300a comprises a chip 143, e.g., a radar integrated circuit 143 and an antenna 142 connected to the chip 143 by a transmission line (TL) 141. The chip 143, the antenna 142 and the transmission line 141 are attached to the PCB 140, i.e., at a top side of the PCB 140.

Such an electric circuit 300a may be tested by the microwave antenna probe 100 described above with respect to FIGS. 1 and 2. The electric circuit 300a is placed at a first area of the PCB 140. The transmission line 141 which is placed at a second area of the PCB 140 connects the electric circuit 300a with the antenna, i.e., the antenna patch 142 described above with respect to FIG. 1. The antenna patch 142 is placed at a third area of the PCB 140 which is separated from the first area by the second area. Both, the transmission line 141 at the second area and the antenna patch 142 at the third area of the PCB 140 are accessible from the above, i.e., the top side of the PCB 140.

FIG. 3b shows a simplified equivalent circuit model 300b of the electric circuit 300a shown in FIG. 3a.

The antenna, i.e., the antenna patch 142 as described above with respect to FIGS. 1, 2 and 3a, can be modelled with a series circuit of an impedance $Z_a$ and a radiation related impedance $Z_r$.

When the system, i.e., the electric circuit 300a shown in FIG. 3a, is matched with its characteristic impedance $Z_0$, that is usually 50 Ohm, the relation $Z_a + Z_r = Z_0$ holds.

The goal is to keep the load impedance $Z_L$ constant regardless if a probe is added into the system.

Apparently, any probe structure approaching antenna may change radiation impedance $Z_r$. And the probe impedance will also change the load impedance $Z_l$ that can be determined by the relation $Z_l = (Z_a + Z_r) \| Z_p$.

However, applying a microwave antenna probe 100 as described above with respect to FIGS. 1, 2 and 3a has the effect of shorting the series circuit of impedance $Z_a$ and radiation related impedance $Z_r$ and replacing this circuit by the microwave antenna probe 100. The microwave antenna probe 100 may have a similar series circuit of impedance $Z_a$ and radiation related impedance $Z_r$ that can be designed to match the system with its characteristic impedance $Z_0$.

Thus, using the disclosed microwave antenna probe 100 allows to test the electric circuit 300a without changing its transmission characteristics or at least without significantly changing its transmission characteristics.

Figure 4:
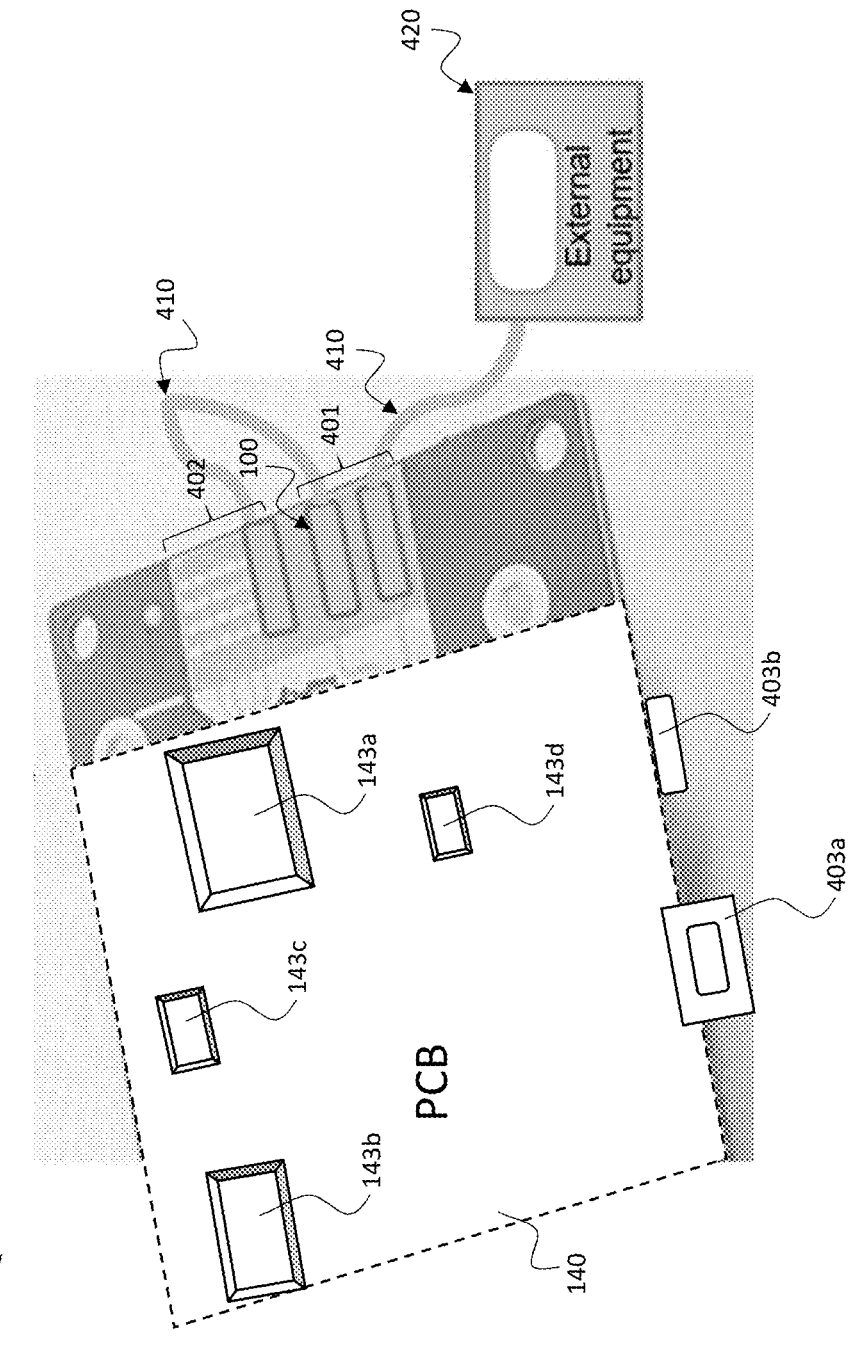
FIG. 4 shows a schematic diagram 400 illustrating a radar system 400 which is tested by a microwave antenna probe 100 according to the disclosure.

FIG. 4 shows a schematic diagram illustrating a radar system 400 which is tested by a microwave antenna probe 100 according to the disclosure.

The figure shows a radar system 400 including a printed circuit board 140 and several electrical components 143a, 143b, 143c, 143d, e.g., a chip or radar IC 143, attached to the PCB 140. One or more mechanical and electrical connectors 403a, 403b may be attached to the PCB 140 for accessing the radar system 400 from external. The radar system 400 comprises several radar transmitter antennas 401 and receiver antennas 402 for transmitting and receiving the radar signals. In this example, an exemplary number of 2 radar transmitter antennas 401 and 6 radar receiver antennas 402 are exemplarily shown.

The microwave antenna probe 100 as described above with respect to FIGS. 1 and 2 can be placed on top of a respective radar transmitter 401 or radar receiver 402 in order to disable the corresponding antenna for non-destructive inspection. This allows radar to be interfaced with high gain waveguide antennas.

This microwave antenna probe 100 can physically cover either transmitter antenna 401 or receiver antenna 402 and disable that antenna, while the signal from that antenna will be redirected to a flexible line 410 which either can be connected to another probe, e.g., for jumping between different Tx and Rx channels, or connected to an external measurement 420.

The microwave antenna probe 100 thus allows non-destructive inspection with flexible interconnection for microwave signal transmission and bridging between channels.

FIG. 5 shows a top cross-section of a microwave antenna probe 100 contacting an antenna patch 142 on a printed circuit board (PCB) 140 according to the disclosure.

The microwave antenna probe 100 may correspond to the microwave antenna probe 100 described above with respect to FIGS. 1 to 4.

As shown in FIG. 5, the microwave antenna probe 100 can be mounted on the printed circuit board 140. The microwave antenna probe 100 can cover the antenna patch 142 and part of a microwave transmission line 141, e.g., a coplanar waveguide (CPW)/microstrip line (MSL), where the antenna patch 142 is contacted directly with the probe 100, but the MSL line part 141 is not touched with the probe 100 due to a clearance channel 146 added on the probe 100. A better illustration of the clearance channel 146 is shown in FIG. 2. An outline 148 of the antenna probe 100 is shown in FIG. 5. The outline 148 covers the antenna patches 142 at the PCB 140.

Referring to FIG. 5, the microwave antenna probe 100 shorts the antenna part, i.e., the antenna patch 142, with contact, this disables the antenna 142. A shim piece 131 with a slot opening 132 is added within the probe 100 which is higher than the PCB 140, i.e., placed above the PCB 140. With the shim 131, an air-filled cavity 130 according to the illustration of FIG. 1 is formed.

With the antenna 142 shorted, the transmission line 141 becomes a short-terminated transmission line, and the microwave signal will start radiating within the cavity 130 formed by the shim 131, and the slot opening 132 on the shim 131 couples the microwave signal from the cavity 130 to the waveguide interface.

The slot opening 132 on the shim 131 can be of a rectangular shape, a bowtie shape, an H-shape or a C-shape. Around the probe 100 periodical holes 113 are added to the surface that contacts the PCB 140 around the cavity 130. With these holes 113, the electro-magnetic signal leakage within PCB 140 substrate will be suppressed. Around the cavity 130, one microstrip line clearance 146 is added to avoid the probe 100 short the transmission line 141 before the transmission line-antenna interfacing section.

When looking at the probe 100 from the top view as in FIG. 5, a bowtie slot version is illustrated as one exemplary implementation of the slot opening. The probe 100 covers the entire antenna 142 and the MSL/CPW transmission line structure, where the probe 100 obtains ground connection from the CPW side 520 passing the ground to the antenna side. The structure forms a cavity 130 between antenna 142 and MSL/CPW interfacing 520.

Within this cavity 130, the signal from CPW side 520 will be redirected into the cavity 130 and will couple upwards to the waveguide 120 as better shown in FIG. 1.

The added periodical holes 113 guard the cavity 130 to avoid electro-magnetic leakage even when the probe 100 has a certain airgap 510 to the PCB 140 due to poor assembly. Some dimensions are provided for 77 GHz operation as an example, however, the sizes can be adjusted for operating at other frequencies.

Simulation results have shown that without the holes 113, the electro-magnetic signal will propagate under the probe 100 within the substrate in an uncontrolled manner, therefore increasing loss and reducing the matching from the CPW side 520. The simulation results have shown that even with a 5 μm airgap 510 less than 2 dB insertion loss and better than 10 dB reflection loss can be achieved from 75 GHz to 85 GHz.

Figure 6:
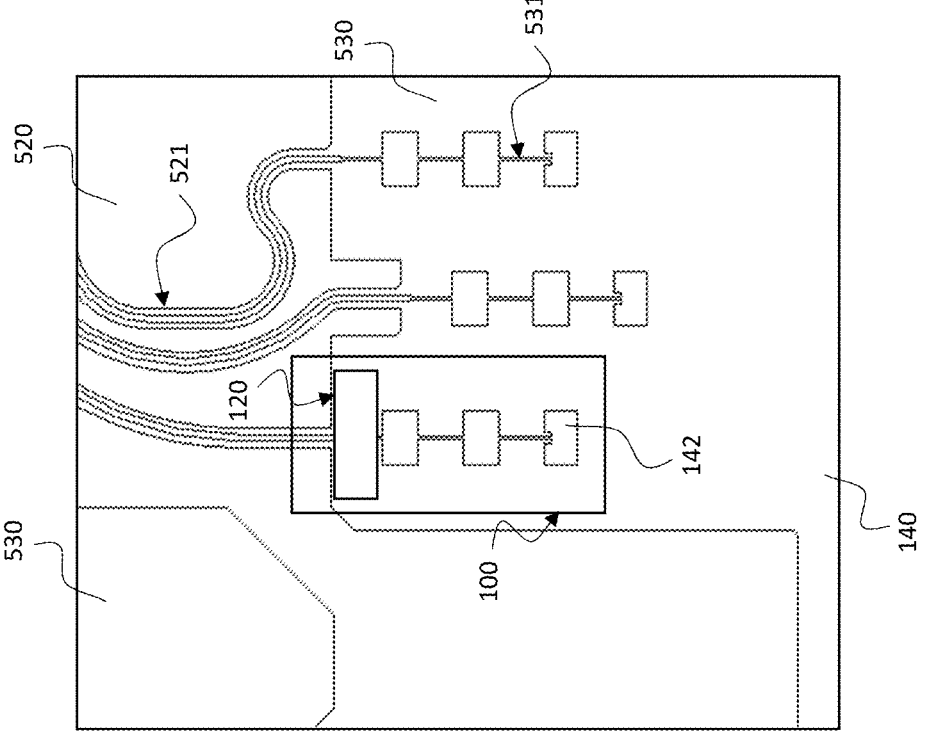
FIG. 6 shows a schematic diagram illustrating an example for placing the microwave antenna probe 100 on an antenna patch 142 of a printed circuit board 140.
Figure 6:
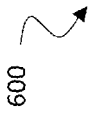

FIG. 6 shows a schematic diagram illustrating an example for placing the microwave antenna probe 100 on an antenna patch 142 of a printed circuit board (PCB) 140.

The PCB 140 comprises a first section 520 including one or more coplanar waveguides 521 and a second section 530 including one or more microstrip lines 531.

The microwave antenna probe 100 may correspond to the microwave antenna probe 100 described above with respect to FIGS. 1 to 5.

In this example, the microwave antenna probe 100 covers part of coplanar waveguide (CPW) section 520, i.e., first section 520 and uses part of microstrip line section 530, i.e., second section 530.

The microwave antenna probe 100 covers the antenna patch 142 of one transmitter or receiver antenna and part of CPW/MSL section 520, 530. The waveguide 120 may be placed above the MSL section 530 at the border between MSL section 530 and CPW section 520.

The waveguide 120 may be implemented, for example, according to WR-12 standardization.

Figure 7:
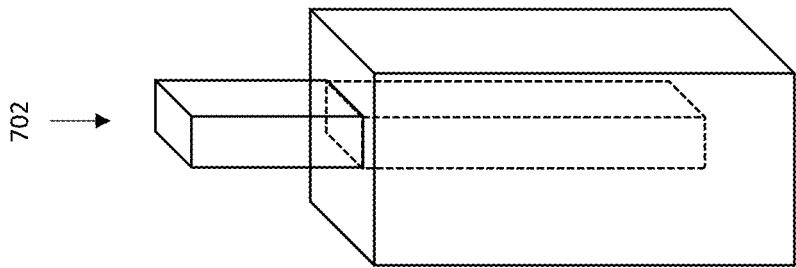
FIG. 7 shows a 3-dimensional view of microwave probe 700a according to a first embodiment and a microwave probe 700b according to a second embodiment.
Figure 7:
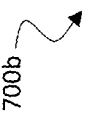
Figure 7:
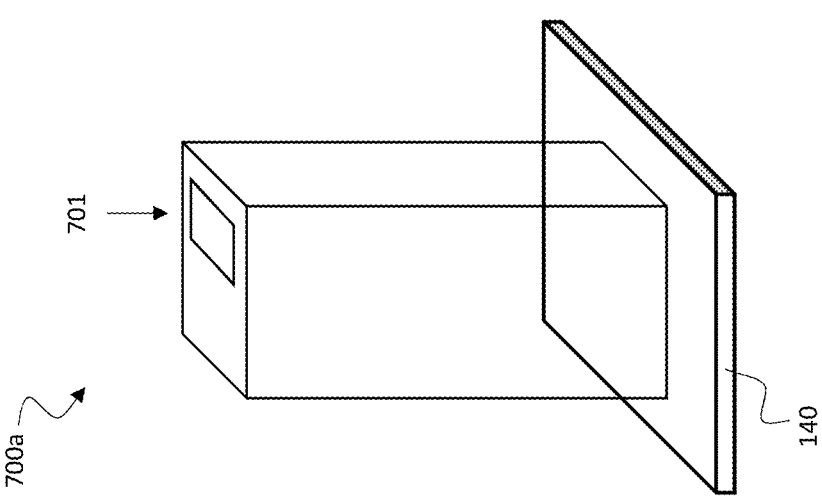

FIG. 7 shows a 3-dimensional view of microwave probe 700a according to a first embodiment and a microwave probe 700b according to a second embodiment.

The probe 700a according to the first embodiment is arranged on a printed circuit board 140, e.g., a radar PCB, and may correspond to the microwave antenna probe 100 described above with respect to FIGS. 1 to 6.

The probe 700a can be used by placing it on top of the radar PCB 140 and covering PCB antennas to convert PCB antenna to standard air-filled waveguide interface 701. This allows standard radar to be used with higher gain waveguide interfacing antenna for range extension or interface with waveguide equipment for inspection.

In an alternative design shown on the right-hand side of FIG. 7, the air-filled waveguide interfacing 701 is replaced by a flexible waveguide 702, which can be Teflon, for example or any other flexible waveguide for easy interconnection between different probes. Several dielectric waveguide examples can be used. When using a dielectric waveguide as shown in the second embodiment, the waveguide 700b will be tapered at the transition from the air-filled waveguide to the dielectric waveguide.

In an alternative implementation of the microwave antenna probe 100 described above with respect to FIGS. 1 to 6, a switch, i.e., a microwave signal switch, can be added between transmission line 141 and antenna patch 142 to enable debugging and test mode.

In another alternative implementation of the microwave antenna probe 100, a specially designed structure of vias may be implemented both on probe 100 side and PCB 140 side to enable antenna disable possibility. In this case the electro-magnetic leakage suppression holes 113 may not be needed. Instead of the holes 113, vias may be added around the antenna. The probe 100 may be attached to the PCB 140 by mechanically connecting the vias on both sides, e.g., by mounting the vias of one side in corresponding holes on the other side.

The probe 100 described in this disclosure may be applied for EMC and mmW radiation Standard Compliance Test or to test interconnection between radar modules manufactured by different companies and associated electro-magnetic radiation. The probe 100 may be applied for OEM (original equipment manufacturer) radar module End-of-line (EoL) calibration and validation. The probe 100 may also be applied for PCB post manufacture validation.

The microwave antenna probe 100 according to the disclosure provides the following benefits:

Frequency modulated continuous wave (FMCW) radar operates across wide frequency band, however, it is still important to ensure phase coherence at each frequency point in every chirp signal. A typical self-calibration topology uses a coupler at the transmission path to determine phase at each frequency point. Once transmission phase is measured an analogue-vector-modulator (AVM) can be used to adjust output waveform phase coherence. The main problem in this setup is when there is a mismatch between transmission IC and antenna, the measured phase deviation is from both frequency source and antenna reflection. Therefore, correct phase adjustment may not be applied. When using the disclosed microwave antenna probe 100, the antenna is shorted, i.e., switched off. Thus, any measured phase deviation is from the frequency source and not from the antenna reflection.

Another benefit is to allow PCB antenna radar extending with the waveguide interfacing without PCB modification.

When using the disclosed microwave antenna probe 100, the antenna can be disabled and connections between any transmitting and receiving channel can be provided to perform wideband phase calibration. The microwave antenna probe 100 can be jointly used with a conventional approach. By comparison, the antenna mismatch can be measured and modelled.

Figure 8:
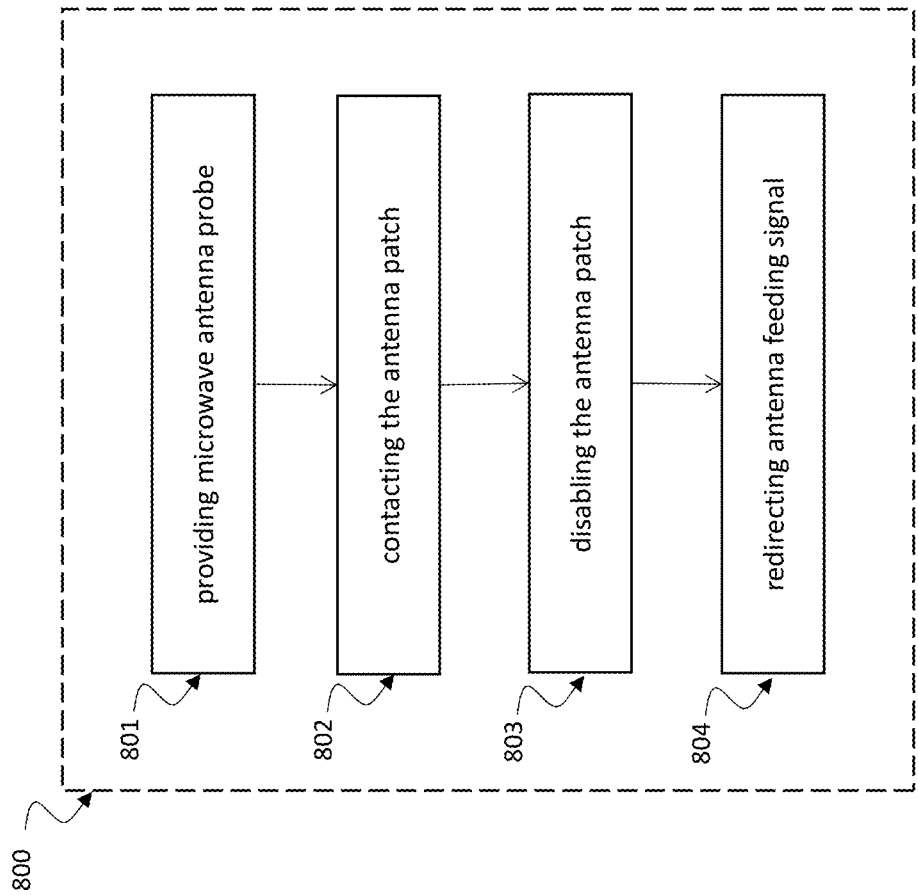
FIG. 8 shows a schematic diagram illustrating a method 800 for controlling an antenna patch attached on a PCB according to the disclosure.

FIG. 8 shows a schematic diagram illustrating a method 800 for controlling an antenna patch attached on a PCB according to the disclosure.

The method 800 can be used for controlling an antenna patch 142 attached on a printed circuit board 140, e.g., as described above with respect to FIGS. 1 to 7.

The method 800 comprises providing 801 a microwave antenna probe 100, e.g., a microwave antenna probe 100 as described above with respect to FIGS. 1 to 7. The microwave antenna probe 100 comprises: a metal body 110 comprising a bottom face 111 and a top face 112 opposing the bottom face 111; a waveguide 120 formed in the metal body 110; and a cavity 130 formed at the bottom face 111 of the metal body 110. The cavity 130 is coupled with the waveguide 120. The cavity 130 is configured to enable microwave transition between a microwave transmission line 141 attached on the printed circuit board 140 and the waveguide 120.

The method 800 comprises contacting 802 the antenna patch 142 by the bottom face 111 of the metal body 110, e.g., as described above with respect to FIGS. 1 to 7.

The method 800 comprises disabling 803 the antenna patch 142 by the contact with the bottom face 111 of the metal body 110, e.g., as described above with respect to FIGS. 1 to 7.

The method 800 comprises redirecting 804 an antenna feeding signal from the microwave transmission line 141 via the cavity 130 to the waveguide 120 by the contact with the bottom face 111 of the metal body 110, e.g., as described above with respect to FIGS. 1 to 7.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A microwave antenna probe for controlling an antenna patch connected to a microwave transmission line, the antenna patch and the microwave transmission line being attached on a printed circuit board, the microwave antenna probe comprising:
   a metal body comprising a bottom face and a top face, the top face opposing the bottom face;
   a waveguide formed in the metal body; and
   a cavity formed at the bottom face of the metal body, the cavity being coupled with the waveguide and configured to enable microwave transition between the microwave transmission line and the waveguide;

wherein the microwave antenna probe is configured to disable the antenna patch and to redirect an antenna feeding signal from the microwave transmission line via the cavity to the waveguide when the antenna patch is contacted by the bottom face of the metal body.

2. The microwave antenna probe of claim 1, wherein the cavity at the bottom face of the metal body is configured for placement above the microwave transmission line to enable the microwave transition via the cavity.

3. The microwave antenna probe of claim 1, the microwave antenna probe comprising a shim formed in the metal body, the shim separating the cavity from the waveguide, wherein the shim comprises at least one slot opening configured to enable the microwave transition between the cavity and the waveguide.

4. The microwave antenna probe of claim 3, wherein the at least one slot opening has a bowtie shape, a C-shape, a H-shape, a rectangular shape or any other geometrical shape.

5. The microwave antenna probe of claim 1, comprising:
   a plurality of holes formed at the bottom face of the metal body, the plurality of holes being configured to suppress microwave signal leakage when the antenna patch is contacted by the bottom face of the metal body.

6. The microwave antenna probe of claim 5, wherein the plurality of holes are periodically distributed across the bottom face of the metal body.

7. The microwave antenna probe of claim 1, wherein the bottom face of the metal body forms a ground plane configured to short the antenna patch to ground when the antenna patch is contacted by the bottom face.

8. The microwave antenna probe of claim 1, comprising a clearance formed at the bottom face of the metal body between the cavity and a lateral side of the bottom face, wherein the clearance is configured for placement above the microwave transmission line and configured to avoid a short of the microwave transmission line when the antenna patch is contacted by the bottom face of the metal body.

9. The microwave antenna probe of claim 1, comprising mechanical attachment means configured to mechanically attach the bottom face of the metal body to the antenna patch by providing a detachable mechanical connection.

10. The microwave antenna probe of claim 1, wherein the waveguide comprises a WR-12 air-filled waveguide extending from the cavity at the bottom face of the metal body to the top face of the metal body.

11. The microwave antenna probe of claim 1, wherein the waveguide comprises a first section formed as an air-filled waveguide and a second section formed as a dielectric waveguide, wherein the waveguide is tapered at a transition from the air-filled waveguide to the dielectric waveguide.

12. The microwave antenna probe of claim 1, wherein a depth of the cavity is a quarter wavelength of the antenna feeding signal.

13. The microwave antenna probe of claim 1, wherein the metal body comprises a full metal body or a plastic core.

14. The microwave antenna probe of claim 1, wherein the antenna feeding signal comprises a microwave signal.

15. A radio frequency arrangement, comprising:
   a microwave antenna probe for controlling an antenna patch connected to a microwave transmission line, the microwave antenna probe comprising:
      a metal body comprising a bottom face and a top face, the top face opposing the bottom face;
      a waveguide formed in the metal body; and
      a cavity formed at the bottom face of the metal body, the cavity being coupled with the waveguide and configured to enable microwave transition between the microwave transmission line and the waveguide;

wherein the microwave antenna probe is configured to disable the antenna patch and to redirect an antenna feeding signal from the microwave transmission line via the cavity to the waveguide when the antenna patch is contacted by the bottom face of the metal body; and a printed circuit board comprising:

the antenna patch attached on the printed circuit board; and the microwave transmission line connecting the antenna patch to an integrated circuit, wherein the microwave transmission line and the integrated circuit are attached on the printed circuit board, wherein the microwave antenna probe is contacting the antenna patch by the bottom face of the metal body.

16. The radio frequency arrangement of claim 15, wherein the cavity at the bottom face of the metal body is configured for placement above the microwave transmission line to enable the microwave transition via the cavity.

17. The radio frequency arrangement of claim 15, wherein the microwave antenna probe comprises a shim formed in the metal body, the shim separating the cavity from the waveguide, wherein the shim comprises at least one slot opening configured to enable the microwave transition between the cavity and the waveguide.

18. The radio frequency arrangement of claim 17, wherein the at least one slot opening has a bowtie shape, a C-shape, a H-shape, a rectangular shape or any other geometrical shape.

19. The radio frequency arrangement of claim 15, wherein the microwave antenna probe comprises a plurality of holes formed at the bottom face of the metal body, the plurality of holes being configured to suppress microwave signal leakage when the antenna patch is contacted by the bottom face of the metal body.

20. A method for controlling an antenna patch attached on a printed circuit board, the method comprising:

providing a microwave antenna probe, the microwave antenna probe comprising:

a metal body comprising a bottom face and a top face, the top face opposing the bottom face;

a waveguide formed in the metal body; and a cavity formed at the bottom face of the metal body, the cavity being coupled with the waveguide and configured to enable microwave transition between a microwave transmission line attached on the printed circuit board and the waveguide;

contacting the antenna patch by the bottom face of the metal body;

disabling the antenna patch by the contact with the bottom face of the metal body; and redirecting an antenna feeding signal from the microwave transmission line via the cavity to the waveguide by the contact with the bottom face of the metal body.

* * * * *